US010248984B2

(12) United States Patent
Bostick et al.

(10) Patent No.: US 10,248,984 B2
(45) Date of Patent: Apr. 2, 2019

(54) BUYER GUIDANCE BASED ON SOCIAL MEDIA CONTACTS

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 14/920,924

(22) Filed: Oct. 23, 2015

(65) Prior Publication Data
US 2017/0116656 A1    Apr. 27, 2017

(51) Int. Cl.
*G06Q 30/00* (2012.01)
*G06Q 30/06* (2012.01)
*G06Q 30/02* (2012.01)
*G06Q 50/00* (2012.01)

(52) U.S. Cl.
CPC ..... *G06Q 30/0623* (2013.01); *G06Q 30/0282* (2013.01); *G06Q 50/01* (2013.01)

(58) Field of Classification Search
CPC .................. G06Q 30/0623; G06Q 30/0282
USPC .................................................. 705/26, 27
See application file for complete search history.

(56) References Cited

U.S. PATENT DOCUMENTS

| 9,275,409 | B2 * | 3/2016 | Mebed ............... G06Q 30/0627 |
| 9,865,013 | B1 * | 1/2018 | Tsing ................. G06Q 30/0631 |
| 2006/0095366 | A1 * | 5/2006 | Sheth ...................... G06Q 30/06 705/37 |
| 2011/0047013 | A1 | 2/2011 | Mckenzie, III |
| 2012/0209832 | A1 * | 8/2012 | Neystadt ........... G06F 17/30867 707/723 |
| 2013/0151309 | A1 | 6/2013 | Chetuparambil et al. |
| 2013/0254215 | A1 * | 9/2013 | Davar ............... G06F 17/30861 707/748 |

(Continued)

FOREIGN PATENT DOCUMENTS

| WO | 2010009281 A2 | 1/2010 |
| WO | 2014075094 A2 | 5/2014 |

OTHER PUBLICATIONS

Arazy et al., "A Theory-Driven Design Framework for Social Recommender Systems," Journal of the Association for Information Systems 11.9: 455-490; Sep. 2010; ProQuest Dialog #763259518, 39pgs. (Year: 2010).*

(Continued)

*Primary Examiner* — Robert M Pond
(74) *Attorney, Agent, or Firm* — Isaac J. Gooshaw

(57) ABSTRACT

A method, computer program product, and computer system is provided. A processor identifies a web page for an item being viewed by a user, where the item is offered for sale by an online marketplace. A processor retrieves at least one contact of the user from a social network. Responsive to a determination the at least one contact reviewed the item, a processor sends a review authored by the at least one contact to the user. Responsive to an indication from the user, a processor initiates an electronic conversation between the contact and the user to discuss the item being viewed by the user.

11 Claims, 5 Drawing Sheets

(56) References Cited

U.S. PATENT DOCUMENTS

2013/0268408 A1* 10/2013 Mebed ............... G06Q 30/0627
705/26.62
2014/0067547 A1  3/2014 Park
2014/0279233 A1  9/2014 Lau et al.

OTHER PUBLICATIONS

IBM; "Advertising system for electronic chat environments"; An IP.com Prior Art Database Technical Disclosure; IP.com No. 000015965; Original Publication Date: Aug. 18, 2002; IP.com Electronic Publication: Jun. 21, 2003; pp. 1-6.

Sunder, Shyam; "System for Facilitating Social Help"; An IP.com Prior Art Database Technical Disclosure; IP.com No. 000232562; IP.com Electronic Publication: Nov. 16, 2013; pp. 1-13.

Verma, Sanjeev; "Effectiveness of social network sites for influencing consumer purchase decisions"; Int. J. Business Excellence; vol. 6, No. 5; 2013; Copyright © 2013 Inderscience Enterprises Ltd.; pp. 624-634.

"A Method and Apparatus for mining useful information from chat history and selling information"; An IP.com Prior Art Database Technical Disclosure; IP.com No. 000205962; IP.com Electronic Publication: Apr. 11, 2011; pp. 1-4.

* cited by examiner

BUYER GUIDANCE BASED ON SOCIAL MEDIA CONTACTS

BACKGROUND OF THE INVENTION

The present invention relates generally to the field of online shopping, and more particularly to providing a buyer guidance in a purchasing decision.

Online shopping or electronic commerce (e-commerce) includes the buying and selling of merchandise or services over the Internet. It encompasses the entire scope of online product and service sales from start to finish. E-commerce tools include computer platforms, applications, solutions, servers and various software formats manufactured by e-commerce service providers and purchased by merchants to increase online sales. Buyer guidance is a tool offered by e-commerce platforms to help users make purchasing decisions when browsing services or merchandise. With the aid of computer platforms, guidance for buyers has become more media rich including multimedia applications to help users decide if a product or service is to their liking.

SUMMARY

Embodiments of the present invention provide a method, system, and program product to provide a buyer guidance in a purchasing decision. A processor identifies a web page for an item being viewed by a user, where the item is offered for sale by an online marketplace. A processor retrieves at least one contact of the user from a social network. Responsive to a determination the at least one contact reviewed the item, a processor sends a review authored by the at least one contact to the user. Responsive to an indication from the user, a processor initiates an electronic conversation between the contact and the user to discuss the item being viewed by the user.

DETAILED DESCRIPTION

Figure 1:
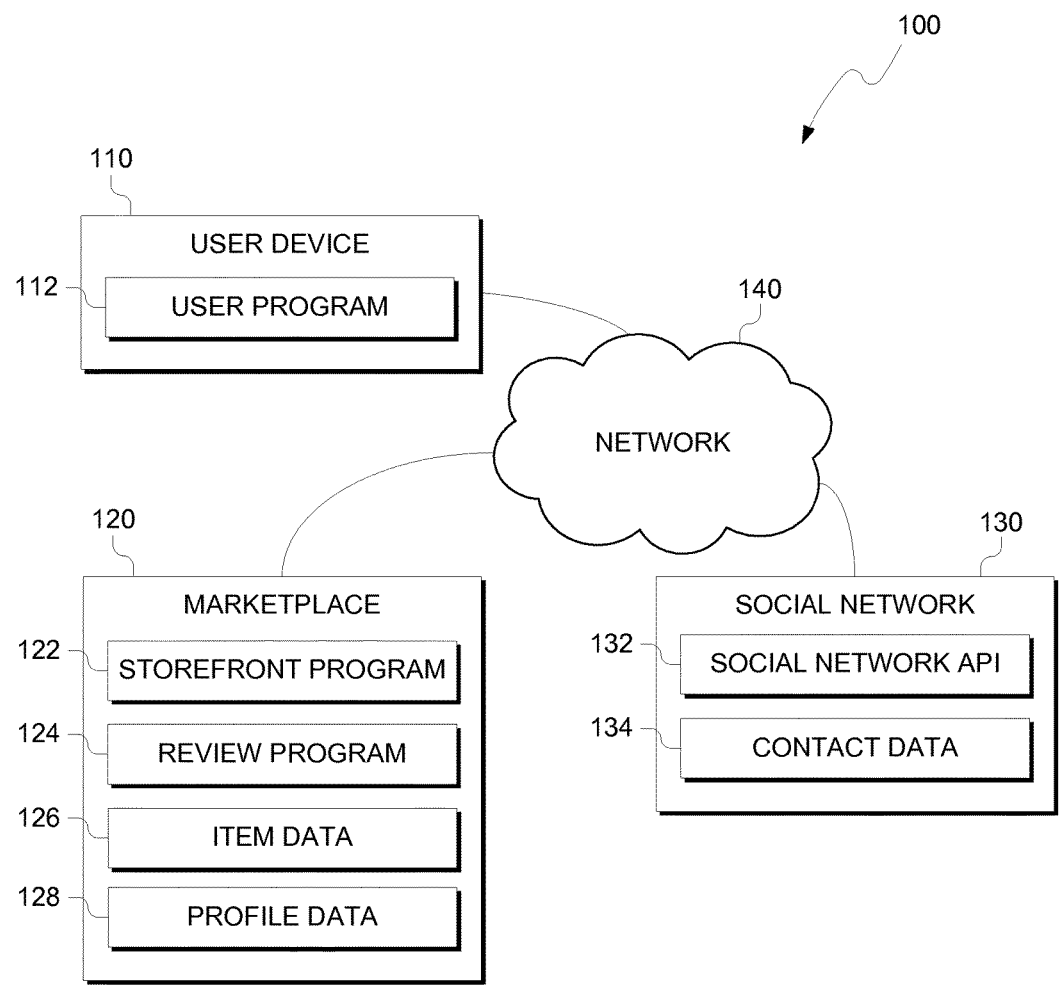
FIG. 1 is a functional block diagram illustrating a networked environment, in accordance with an embodiment of the present invention.

While solutions to providing buyer guidance are known, they typically provide hundreds of reviews for a product or service. However, the relevance of the reviews to an interest of a user are rarely met since the reviews come from multiple unknown sources. Furthermore, the origin and intention of the reviews may be suspect. Embodiments of the present invention recognize that by providing mechanisms and processes to retrieve reviews made by social network contacts (e.g., friends, family members, followers, etc.) of the user, more relevant and trustworthy reviews are provided to a user browsing for a given product or service. Furthermore, embodiments of the present invention recognize that, by providing a communication channel between the user and social network contacts of the user who have bought or reviewed a product, questions of a user and concerns about a product or service can be addressed by a trusted source.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computer of a user, partly on the computer of the user, as a stand-alone software package, partly on the computer of the user and partly on a remote computer or entirely on the remote computer or server. In the latter scenario, the remote computer may be connected to the computer of the user through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110, marketplace 120, and social network 130 connected over network 140. User device 110 includes user program 112. Marketplace 120 includes storefront program 122, review program 124, item data 126, and profile data 128. Social network 130 includes social network application programming interface (API) 132 and contact data 134.

In various embodiments of the present invention, user device 110, marketplace 120, and social network 130 are each a computing device that can be a standalone device, a server, a laptop computer, a tablet computer, a netbook computer, a personal computer (PC), or a desktop computer. In another embodiment, user device 110, marketplace 120, social network 130, or any combination thereof each represent a computing system utilizing clustered computers and components to act as a single pool of seamless resources. In general, user device 110, marketplace 120, and social network 130 can be any computing device or a combination of devices with access to item data 126, profile data 128, or contact data 134 and is capable of executing user program 112, storefront program 122, review program 124, or social network API 132. User device 110, marketplace 120, and social network 130 may include internal and external hardware components, as depicted and described in further detail with respect to FIG. 3.

In this exemplary embodiment, user program 112 is stored on user device. Storefront program 122, review program 124, item data 126, and profile data 128 are stored on marketplace 120. Social network API 132 and contact data 134 are stored on social network 130. However, in other embodiments, user program 112, storefront program 122, review program 124, item data 126, profile data 128, social network API 132, or contact data 134 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between user device 110, marketplace 120, and social network 130, in accordance with a desired embodiment of the present invention.

In various embodiments, user device 110 includes user program 112. User program 112 provides access to an online marketplace provided by marketplace 120. In some embodiments, user program 112 is a web browser. In other embodiments, user program 112 is a stand-alone application for accessing the online marketplace. Marketplace 120 provides a storefront program 122 to a user via user program 112. User program 112 allows a user to select and purchase various items such as products or services for sale. Storefront program 122 provides information regarding the items for sale to user program 112. For example, storefront program 122 provides descriptions of the items and prices associated with the purchase of the items.

In various embodiments, marketplace 120 includes review program 124. When a user views a page for an item, storefront program 122 retrieves an item listing for the item including, but not limited to, images of the item, a description of the item, features of the item, price of the item, or any information describing an item and the like. Item data 126 includes the various products or services offered by marketplace 120, along with information associated with the item (e.g., a name of an item, images of the item, an item description, a price of an item, or similar information regarding an item provided on an online marketplace). Additionally, item data 126 includes various user reviews for each product or service listed in item data 126. When a user views an item, storefront program 122 sends item data 126 to user program 112 for display to the user. For example, storefront program 122 generates a web page for user program 112 to display, given user program 112 is a web browser. When a user views an item, review program 124 retrieves reviews for the item from item data 126. A review may include an article of text describing an experience of a customer with the item and, in some instances, a rating. In other instances, images, video or audio may be included with a review. When a user views an item, review program 124 retrieves reviews from item data 126 associated with the item. In various embodiments, review program 124 retrieves a profile associated with the user providing a review from profile data 128.

Profile data 128 includes various profiles for users of marketplace 120. Profile data 128 includes a username or other identifier to identify a user. In some embodiments, profile data 128 includes social networking information for each profile. For example, a profile includes information indicating a social network a user belongs to and information to access information provided by the social network (e.g., a login or token to authenticate access to a social network by the user). In some embodiments, profile data 128 includes links to or information indicative of a contacts of a user on a social network. For example, a profile includes names, usernames, or other identifiers of users of a social network. As discussed herein and for clarity, a single social network is depicted in FIG. 1 (e.g., social network 130). One of ordinary skill in the art will appreciate that profile data 128 may include information regarding multiple social networks without deviating from the invention. In some embodiments, profile data 128 includes a purchase history of each user. For example, profile data 128 includes previous items purchased by each user and a category other classification information (e.g., a tag) indicating the type of item that was purchased (e.g., a coffee cup is categorized in "dishware").

Social network 130 includes social network API 132 and contact data 134. Social network API 132 provides an application interface to perform functions and retrieve various types of information regarding a social network platform. In various embodiments, social network 130 provides a platform for users to share content or messages with other users, thereby creating a social network contact. Social network 130 also provides a mechanism for users to have various contacts with other users of social network 130. For example, users may become "friends" with one another, allowing them to share content with each other. As another example, social network 130 provides mechanisms for users to create and join groups. Users with similar interest or other characteristics may create groups to share content with like-minded or similar people. As another example, a user may follow another user where content from the followed user is shared with followers, but content posted from followers is not necessarily shared with a user that is followed. One of ordinary skill in the art will appreciate that any form of a relationship between users in social network 130 may be used to represent a social network contact, such as friends, members of a group, followers, and the like, without deviating from the invention. Contact data 134 includes the various social network contacts for users of social network 130 (e.g., friends and members of groups a user belongs to).

In some embodiments, review program 124 retrieves contact data 134 for a user from social network API 132 when the user accesses storefront program 122 or any other service of marketplace 120 (e.g., a login or authentication service). Review program 124 stores the various social network contacts for a user in a profile of profile data 128 associated with the user. In other embodiments, social network API 132 pushes updated contact data 134 to review program 124. For example, a user creates a new contact on social network 130, updating contact data 134 associated with the user. Social network API 132 sends the updated contact data 134 to review program 124. Review program 124 updates profile data 128 to store the new social network contact relationship indicated in the updated contact data 134.

In various embodiments, when a user views a web page for an item, review program 124 sends information to user program 112 in order to display reviews for the item. Furthermore, review program 124 determines if any reviews have been posted by other users who are social network contacts with the user viewing the item. If a social network contact has posted a review for an item, then review program 124 sends a message indicating the review, created by a social network contact, to user program 112. In some instances, review posted by contacts may be displayed before other reviews. In other instances, a pop-up message may be displayed indicating the review created by the social network contact. In various embodiments, user program 112 provides an interface to the user to initiate a conversation with the social network contact. For example, user program 112 provides an interface element next to the review created by the social network contact to start a conversation. Based on receiving an indication to initiate a conversation with the social network contact, review program 124 sends a message to the social network contact to asking if they would like to participate. If the social network contact indicates they are willing to participate, then review program 124 creates an electronic conversation between the user and the social network contact.

In some embodiments, profile data 128 includes contact information such as a phone number or other identifying information to initiate a conversation between a user and a contact. When review program 124 determines that a contact has provided a review of an item, review program 124 sends an indication of the contacts review to user program 112. User program 112 provides an interface element that when selected initiates the conversation between the user and the contact. In response to the user selecting the interface element, user program 112 sends an indication to review program 124. Review program 124 then establishes a connection between the user and contact. In one embodiment, review program 124 establishes a voice conversation using Voice Over Internet Protocol (VOIP). In some scenarios, the voice conversation may be passed through or conducted entirely using a plain-old telephone system (POTS). For example, the contact may provide a phone number to be reached at in profile data 128. Review program 124 creates a voice communication channel between user device 110 and a device of the contact, as indicated by the phone number (a POTS or VOIP enabled device). In another embodiment, a contact has a program installed on a device owned by the contact (e.g., an app on a smartphone). Additionally the program executing on the device of the contact provides review program 124 with a communication address to reach the device of the contact (e.g., an Internet Protocol (IP) address). Review program 124 uses the provided communication address to initiate the conversation between the user and the contact. In various scenarios, review program 124 sends various types of information associated with the page of the item to the contact to inform the contact of the item or the review the contact provided.

In some scenarios, the conversation is a video chat or audio chat between the user and the social network contact. In another scenario, review program 124 shares a view between the user and the contact of the item page. The social network contact and the user may create annotations and other marking on the shared view to further discuss the item. In another scenario, the electronic conversation is a text based chat. In such a scenario, review program 124 sends a text copy of information presented on the page of the item to the contact to inform the contact of the item or the review the contact provided. For example, when a user initiates a text based conversation with a user, review program 124 sends a text based invitation to the contact, such a text message over a Smart Messaging Service (SMS) to a mobile device of the contact. The contact may respond with a "Yes" or "No" text response to communicate with the user to discuss the item and the contact experience with the item (e.g., the review created by the social network contact). Additionally, review program 124 may send a copy of the review the contact provided to the contact or any relevant item data 126, such that the contact can become familiarized with the item prior to discussion with the user.

In various embodiments, review program 124 stores the electronic conversation between the user and the social network contact, including any annotations if provided. In some embodiments, if a different user views the page of the item on marketplace 120, then review program 124 presents the stored electronic conversation to the user. In some instances, review program 124 may present the electronic conversation only to social network contacts of either the first user or the social network contact that had the conversation. In other instances, review program 124 may present the conversation based on an indication of consent from the user, the social network contact or both.

In some embodiments, review program 124 requests an evaluation of the conversation from the user regarding the helpfulness of the conversation. If a conversation was helpful, a user provides user program 112 with an indication of the helpfulness of the conversation, with user program 112 sending the indication to review program 124. Review program 124 stores the indication in a profile of the contact in profile data 128. As discussed herein, review program 124 will promote reviews provided by contacts with higher amounts of helpful conversations.

In some embodiments, review program 124 determines a confidence score for social network contacts relative to the user viewing an item. The confidence score indicates how helpful a review created by the social network contact may be to the user. For reviews from contacts with a high confidence score, review program 124 displays the reviews in a higher order (e.g., at the top of a list of reviews) than those reviews from contacts with a lower confidence score. In some scenarios, review program 124 determines a confidence score for a review created by the social network contact based on the purchase history of the contact and the user. If the purchase history of the contact and the user are similar, then review program 124 assigns a higher confidence score to the review created by the social network contact when compared to a review provided by another contact who has a different purchase history than the user. For example, profile data 128 includes a purchase history of each user of marketplace 120. Additionally, the purchase history includes categories of items (e.g., sporting goods, clothing, etc.) for the items purchased. If the user and a contact have a higher amount of purchases in a similar category, then review program 124 assigns a high confidence score that the review will be helpful.

In other scenarios, review program 124 determines a confidence score for a review created by the social network contact based on previous evaluations of conversations including the contact. After an electronic conversation between a user and a contact is recorded, review program 124 requests an evaluation of the contact from the user via user program 112. In one scenario, a user provides a "yes" or "no" of other binary evaluation of the helpfulness of the contact during the conversation. In another scenario, a user provides a score (e.g., a score on a five point scale) with a higher score indicating a more helpful conversation and a lower score indicating a less helpful conversation. For a contact whose conversations have a higher average helpfulness evaluation, review program 124 assigns a higher confidence score.

Figure 2:
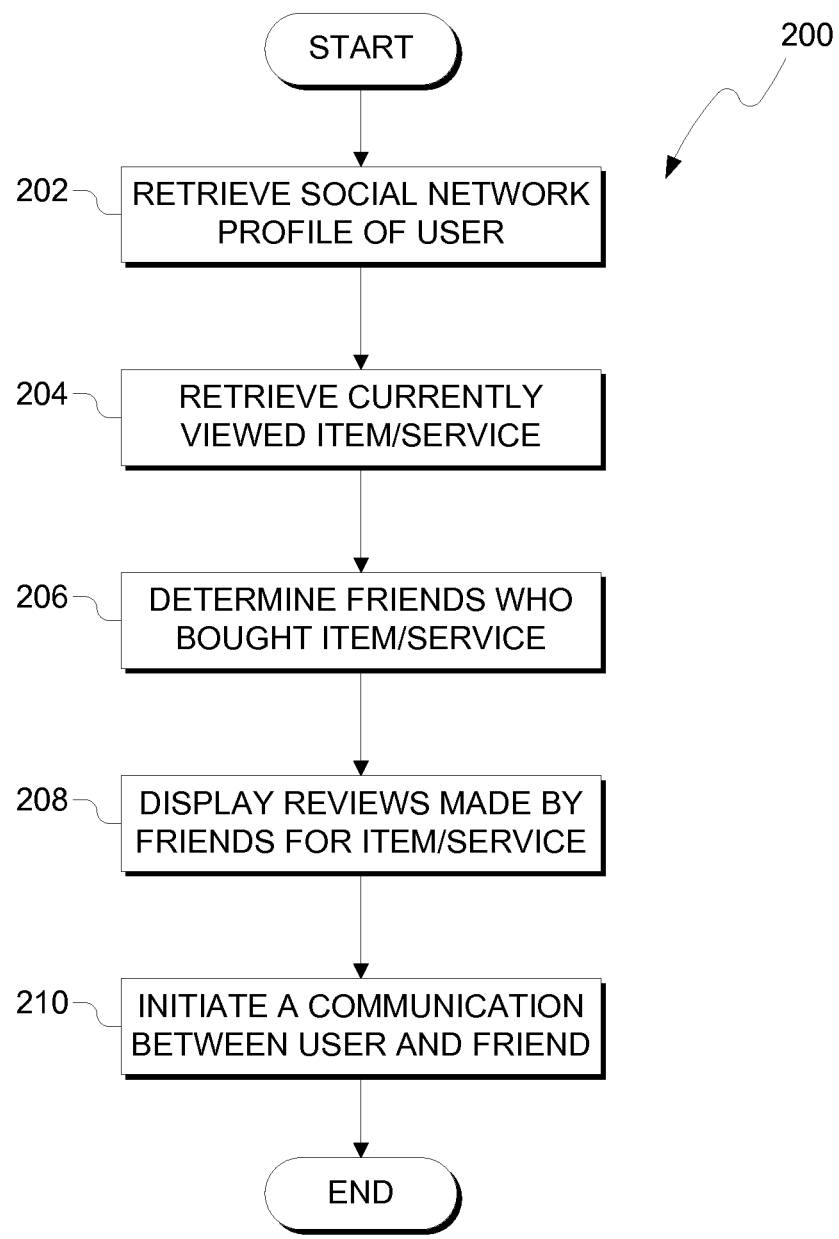
FIG. 2 illustrates operational processes of review program, on a computing device within the environment of FIG. 1, in accordance with an embodiment of the present invention.

FIG. 2 illustrates operational processes, generally designated 200, of review program 124. In process 202, review program 124 retrieves the social network profile of a user in profile data 128. When a user accesses storefront program 122, review program 124 retrieves the profile of the user and identifies social network contacts associated with the user. In process 204, review program 124 retrieves user reviews for the currently viewed item by the user. As a user searches for and views items in storefront program 122, review program 124 retrieves reviews associated with the currently viewed item. In process 206, review program 124 determines if any social network contacts of the user posted a review of the viewed item. In some embodiments, review program 124 identifies if a review in item data 126 for the item has been created by a social network contact of the user. In other embodiments, review program 124 retrieves reviews from other sources. For example, a c400ontact may have posted a review as a message on social network 130. When review program 124 determines a review for the currently viewed item has been posted by a social network contact of the user, either on marketplace 120 or social network 130, review program 124 displays the review made by the social network contact to the user (process 208).

In process 210, review program 124 initiates a communication between the user and the social network contact. Review program 124 sends a command to user program 112 to ask if the user would like to communicate with the social network contact who posted the review. Based on input received by the user, user program 112 sends an indication to review program to initiate the communication. Review program 124 sends an invitation to a device (not shown) of the social network contact to initiate the communication. Based on the acceptance of the invitation by the social network contact, review program 124 establishes a communication between the user and social network contact. In some embodiments, the communication is a text, audio or video based chat. In further embodiments, the communication includes a shared view of the items page as presented by storefront program 122. Both the user and the social network contact can write annotations and other marking to the items page to identify points of discussion related to the item.

In various embodiments, review program 124 stores a copy of the communication. When a user later views the items page presented by storefront program 122, review program 124 retrieves the stored communication for presentation to the user. As such, the user can listen to or view the conversation to determine if they also would like to purchase the item. In some embodiments, review program 124 shares the communication only when a social network contact of one of the first user, the social network contact the first user, or both views the items page. In another embodiment, review program 124 shares the communication with other users who view the items page based on a received permission from both the first user and the social network contact.

Figure 3:
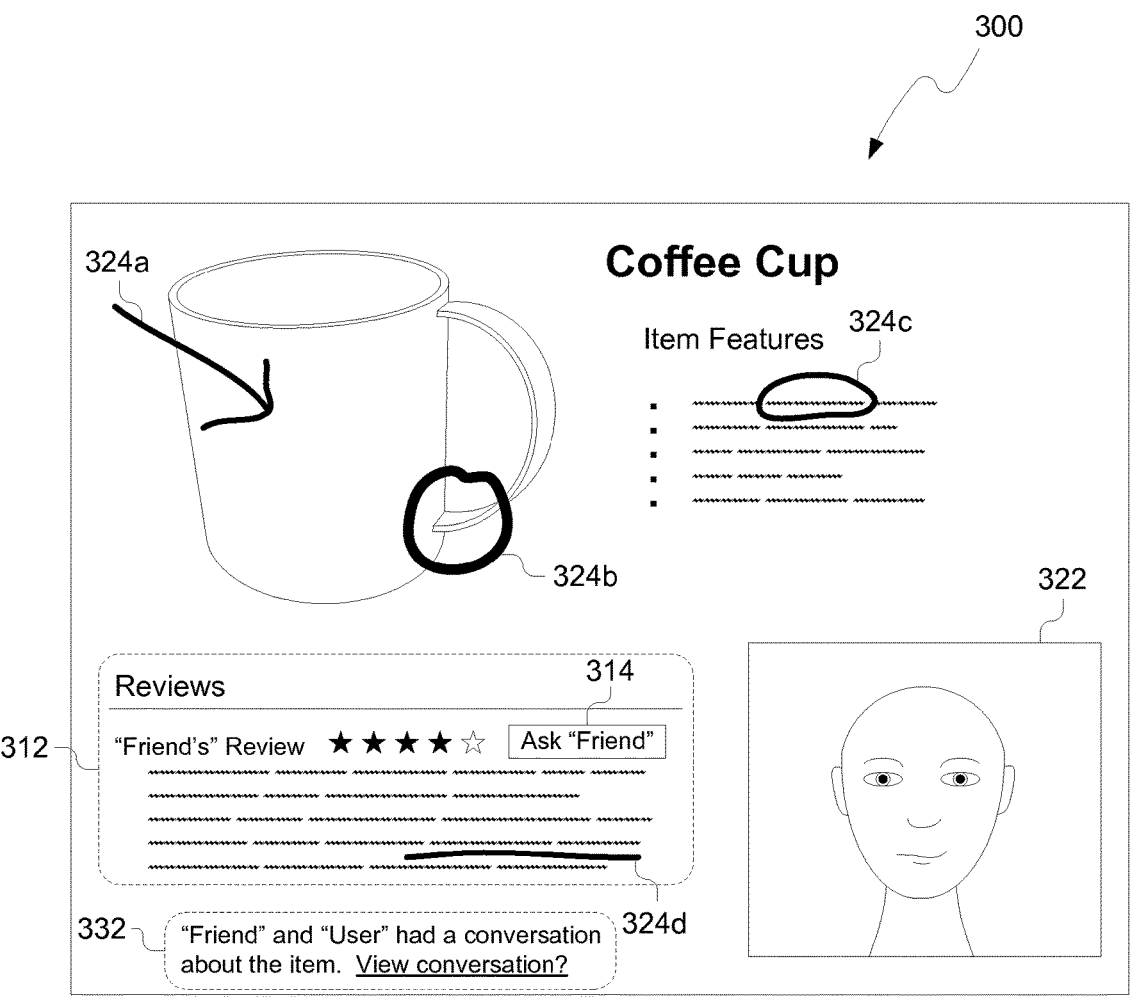
FIG. 3 depicts an example screenshot of a shared view of an item between a user and a contact, in accordance with an embodiment of the present invention.

FIG. 3 depicts example screenshot 300 of a shared view of an item between a user and a contact. Screenshot 300 illustrates a view of an item as displayed by user program 112. The item view includes information pertaining to the item, such as an image of the item, an item name, and features of the item. Additionally, screenshot includes review 312, initiate conversation interface element 314, video conversation window 322, annotations 324a-d, and saved conversation notification 332. Review 312 includes a review from a social network contact of the user viewing the page of the item. As discussed herein, review program 124 retrieves social network contacts of the user from a social network (e.g., social network 130). Review program 124 determines if a contact has posted a review of the currently viewed item. When an item has been reviewed by a contact of a user, review program 124 displays the review created by the social network contact (i.e., review 312). In a scenario, the review includes text of the experience of the contact with the item. In another scenario, the review includes a rating of the item by the contact. In other scenarios, the review may include images, video, or audio recorded by the contact to include with the review.

While not shown in FIG. 3, screenshot 300 may include multiple reviews, similar to review 312, from a various social network contacts of the user viewing the item. As discussed herein and specifically in FIG. 4, review program 124 determines a confidence score for each contact relative to the item being viewed by the user. Based on the confidence score for each contact, review program 124 displays reviews in an elevated fashion (e.g., higher in a list) for contacts with high confidence scores. Furthermore, while not shown in FIG. 3, screenshot 300 may also include reviews from other users that are not social network contacts with the user viewing the item (e.g., when no social network contacts have reviewed an item). Furthermore, in some embodiments, recorded electronic conversations between reviewers or users who are not social network contacts with a user viewing an item may be presented to the viewing user. For example, a reviewer and a user may give consent to share an electronic conversation with all users of marketplace 120.

In various embodiments, review 312 includes initiate conversation interface element 314. When selected, user program 112 sends an indication or review program 124 that the user wishes to converse with the contact. In response, review program 124 initiates a conversation between the user and the social network contact associated with the review. As discussed herein, the conversation between user and contact may be in many forms and communication paths including, but not limited to, VOIP conversations, POTS conversation, a text based chat, or a video conference. Review program 124 stores the conversation once completed, for later retrieval for other users, as discussed herein.

In this example, screenshot 300 illustrates video conversation window 322 where a video conference is conducted between the user of user device 110 and the contact. Additionally, the example illustrates a conversation where the user and contact share a view of the item page. When the conversation includes a shared view, one or both of the user and the contact may either create annotations 324a-d, or create markings on the page of the item. As the user and contact discuss the item, the contact or user may make a marking on the shared view to highlight a part of the page of the item to aid in the discussion of the item. For example, the contact may make annotations 324a and 324b indicating talking points regarding the image of the item. Additionally, the user may make annotations 324c and 324d to highlight specific features or parts of the contacts review about which they have questions. When a user or contact makes an annotation on their respective device and is received by the respective program, the corresponding user or contact program replicates the annotation such that the markings are seen by both user and contact (e.g., the view of the page of the item is shared including any annotations).

In some embodiments, as either the user or contact makes annotations to an page of the item, review program 124 records the location of the annotations on the page of the item. Additionally, review program 124 records the timing of when the annotations where made regarding the recorded conversation. As such, review program 124 may reproduce the recorded conversation, and any annotations made, between the user and contact to other users of marketplace 120. Saved conversation notification 332 illustrates i) that a recorded conversation between a "friend" of the user viewing the page of the item and another "user" has been recorded, and ii) offers the conversation for playback. Upon selection by a user, user program 112 retrieves the recorded conversation and plays back the conversation for the user. In a scenario where a shared view and annotations where made, user program 112 reproduces the annotations on the page of the item as they were made in the recorded conversation. As such, a user could retrieve other conversations made between other users and contacts to provide additional guidance for the buyer when a user considers purchasing an item.

Figure 4:
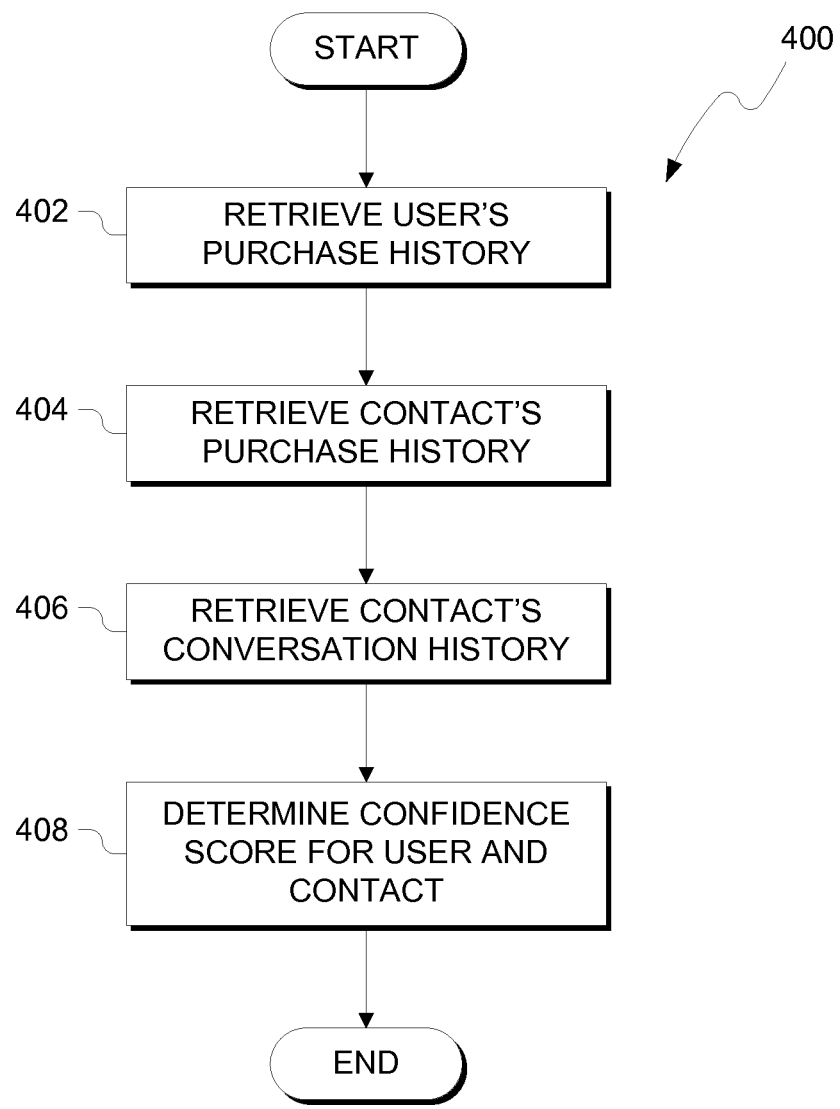
FIG. 4 illustrates operational processes of review program determining a confidence level of a contact, on a computing device within the environment of FIG. 1, in accordance with an embodiment of the present invention.

Referring to FIG. 4, when a user views an items page, as retrieved by storefront program 122, review program 124 retrieves reviews for the item. As discussed herein, review program 124 determines if reviews for the item have been made by one or more social network contacts associated with the user viewing the item. In some embodiments, more than one contact may have a review for the item. In such embodiments, review program 124 determines a confidence score for each contact. For contacts with higher confidence score, review program 124 presents the review in an elevated fashion. For example, a review with a high confidence score may be highlighted or placed at the top of a list. FIG. 4 illustrates operational processes, generally designated 400, of review program 124 determining a confidence level of a contact. In process 402, review program 124 retrieves a purchase history of the user. Profile data 128 includes previous items purchased by users of marketplace 120. Additionally, profile data 128 includes a category or other form of classification for each purchased item (e.g., "footwear," "movie," etc.). In process 404, review program 124 retrieves a purchase history of the contact, including the categories the contact has previously purchased.

When comparing purchase histories, review program 124 assigns higher confidence scores to contacts that share common purchase categories with the user viewing the item. For example, a user has purchased ten items in the past, with five purchases in a shoe category, three in a sporting goods category, and two in a cooking utensils category. When the user views a page for an item, review program 124 determines two social network contacts (i.e., Contact A and Contact B) of the user have posted reviews for the viewed item. Contact A has a purchase history of seven purchases in the shoe category, and three purchases in a clothing category. Contact B has two purchases in the shoe category and eight in a jewelry category. Review program 124 compares the distribution of categories in purchase histories of the user to both Contact A and Contact B. Since both the user and Contact A have a large distribution of purchases in a shared category (i.e., 50% and 80%, respectively, in the shoe category), then review program 124 will assign a higher confidence score to Contact A than Contact B, who has a smaller distribution of purchases in a shared category (i.e., 20%).

In process 406, review program 124 retrieves the conversation history of the contact. In some embodiments, user program 112 prompts a user for an evaluation of the contact after a conversation between the user and a contact. The evaluation indicates how helpful the user believed the conversation to be. User program 112 sends the evaluation to review program 124 and, in response, review program 124 stores the evaluation in profile data 128 associated with the contact. When determining a score for a contact, review program 124 retrieves the one or more evaluation scores associated with the contact. For contacts with a positive evaluation, review program 124 assigns a higher confidence score. Similarly, for contacts with a negative evaluation, review program 124 assigns a lower confidence score. For example, user program 112 provides an evaluation interface to the user including a binary decision (e.g. "Was the conversation helpful? Yes or No?" or "Would you recommend the contact for other conversations? Thumbs Up or Thumbs Down?"). For each positive evaluation, review program 124 positively increments the confidence score (e.g., adds a +1 to the confidence score). For each negative evaluation, review program 124 negatively increments the confidence score (e.g., adds a −1 to the confidence score). In another example, the evaluation score is based on a rating of one to five, with five being most helpful and 1 being least helpful. As such, review program 124 may average the evaluation scores.

In process 408, review program 124 determines a confidence score for a contact. For contacts that have similar purchase histories to the user, review program 124 assigns a higher confidence score. Additionally, for contacts that have provided helpful conversations in the past, review program 124 assigns a higher confidence score. In some embodiments, review program 124 combines the confidence scores for purchases histories and evaluations as a weighted average. Review program 124 may change the weight assigned to purchases histories and evaluations to provide a different confidence score based on preferences of the user viewing the item (e.g., the user prefers contacts with similar purchases or are more helpful). By determining a confidence score for contacts who have posted reviews for an item, review program 124 provides reviews made by contacts that share similar purchasing interests with the user and, also, contact who been found to provide helpful advice to other users. Therefore, by promoting reviews made by contacts with high confidence scores, a user can quickly find with contacts with reviews that may be more helpful and provide advice similar to the interests of the user.

Figure 5:
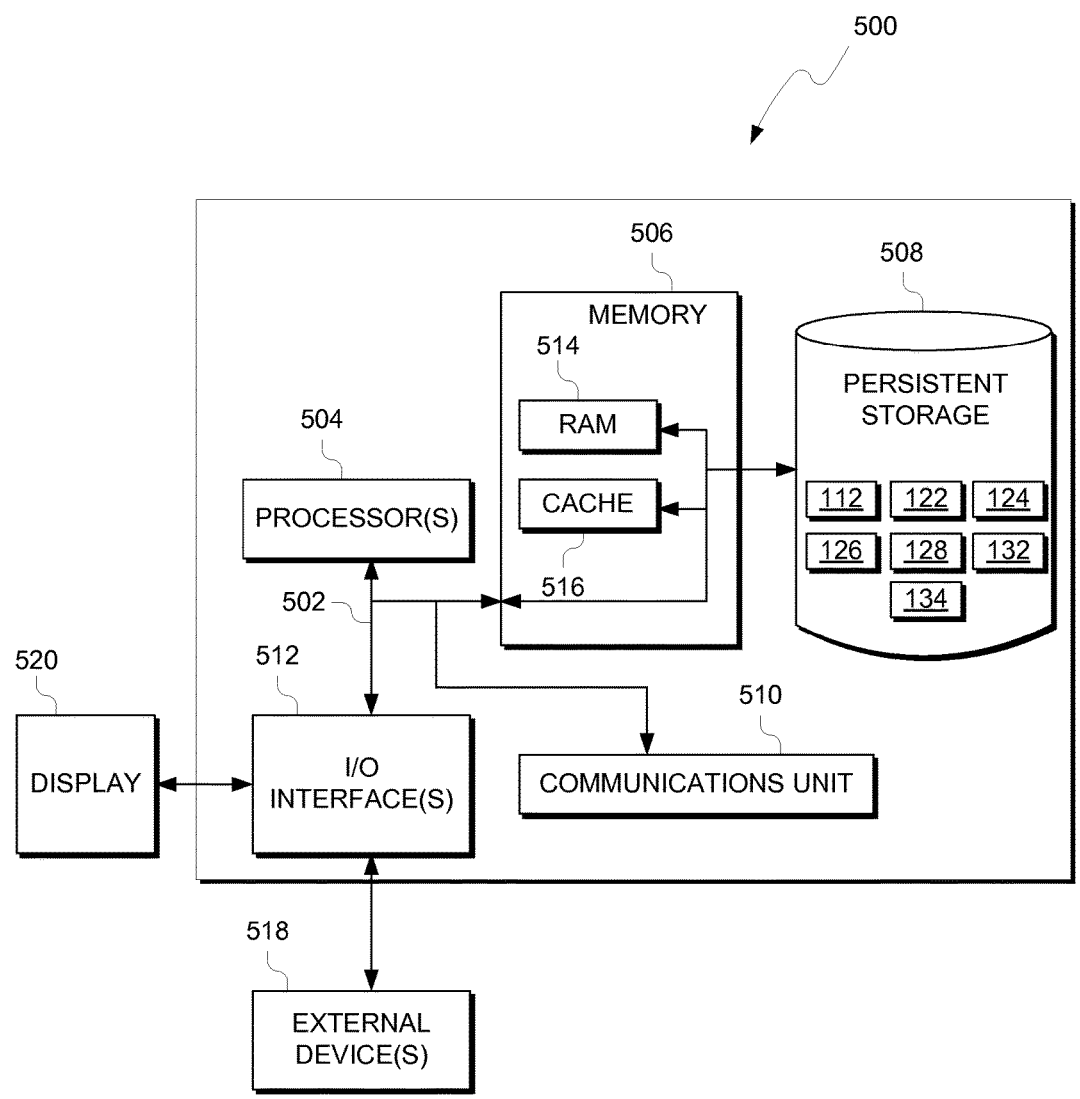
FIG. 5 depicts a block diagram of components of the computing device executing a review program, in accordance with an embodiment of the present invention.

FIG. 5 depicts a block diagram, 500, of components of user device 110, marketplace 120, and social network 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110, marketplace 120, and social network 130 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

User program 112, storefront program 122, review program 124, item data 126, profile data 128, social network API 132 and contact data 134 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. User program 112, storefront program 122, review program 124, item data 126, profile data 128, social network API 132 and contact data 134 may be downloaded to persistent storage 508 through communications unit 510.

I/O interface(s) 512 allows for input and output of data with other devices that may be connected to user device 110, marketplace 120 or social network 130. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., user program 112, storefront program 122, review program 124, item data 126, profile data 128, social network API 132 and contact data 134 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    identifying, by one or more processors, a web page for an item being viewed by a user, wherein the item is offered for sale by an online marketplace;
    retrieving, by the one or more processors, at least one contact of the user from a social network;
    in response to a determination the at least one contact reviewed the item, sending, by the one or more processors, a review authored by the at least one contact to the user;
    in response to an indication from the user, initiating, by the one or more processors, an electronic conversation between a first contact and the user to discuss the item being viewed by the user, wherein the electronic conversation includes a shared view of the web page for the item between the first contact and the user;
    in response to receiving an annotation made by the user on the shared view, displaying, by the one or more processors, the annotation on the shared view of the page for the first contact;
    determining, by the one or more processors, a display order of a first review and a second review based, at least in part, on a first confidence score and a second confidence score, wherein (i) the first confidence score indicates a similarity in a purchase history of the user and a purchase of the first contact; and (ii) the second confidence score indicates a similarity in the purchase history of the user and a purchase of a second contact;
    displaying, by the one or more processors, the first review for the item posted by the first contact based on the display order, wherein the first review is displayed in the shared view of the web page for the item between the first contact and the user; and
    displaying, by the one or more processors, the second review for the item posted by the second contact based on the display order, wherein the second review is displayed in the shared view of the web page for the item between the first contact and the user.

2. The method of claim 1, wherein the electronic conversation includes a copy of the review.

3. The method of claim 1, the method further comprising:
    storing, by the one or more processors, the electronic conversation; and
    in response to an indication that a second user views the item, sending, by the one or more processors, an indication of the electronic conversation to the second user, wherein the second user is a contact in the social network of one or more of the user or the at least one contact.

4. The method of claim 1, the method further comprising: determining, by the one or more processors, a second display order of the first review and the second review based, at least in part, on a third confidence score and a fourth confidence score, wherein (i) the third confidence score is based, at least in part, on a first evaluation of previous electronic conversations including the first contact as a participant; and (ii) the fourth confidence score is based, at least in part, on a second evaluation of previous electronic conversations including the second contact as a participant.

5. A computer program product comprising:
    one or more computer-readable storage media and program instructions stored on the one or more computer-readable storage media, the program instructions comprising:
        program instructions to identify a web page for an item being viewed by a user, wherein the item is offered for sale by an online marketplace;
        program instructions to retrieve at least one contact of the user from a social network;
        responsive to a determination the at least one contact reviewed the item, program instructions to send a review authored by the at least one contact to the user;
        responsive to an indication from the user, program instructions to initiate an electronic conversation between a first contact and the user to discuss the item being viewed by the user, wherein the electronic conversation includes a shared view of the web page for the item between the first contact and the user;
        responsive to receiving an annotation made by the user on the shared view, program instructions to display the annotation on the shared view of the page for the first contact;
        program instructions to determine a display order of a first review and a second review based, at least in part, on a first confidence score and a second confidence score, wherein (i) the first confidence score indicates a similarity in a purchase history of the user and a purchase of the first contact; and (ii) the second confidence score indicates a similarity in the purchase history of the user and a purchase of a second contact;
        program instructions to display the first review for the item posted by the first contact based on the display order, wherein the first review is displayed in the shared view of the web page for the item between the first contact and the user; and
        program instructions to display the second review for the item posted by the second contact based on the display order, wherein the second review is displayed in the shared view of the web page for the item between the first contact and the user.

6. The computer program product of claim 5, wherein the electronic conversation includes a copy of the review.

7. The computer program product of claim 5, the program instructions further comprising:
    program instructions to store the electronic conversation; and
    responsive to an indication that a second user views the item, program instructions to send an indication of the electronic conversation to the second user, wherein the second user is a contact in the social network of one or more of the user or the at least one contact.

8. The computer program product of claim 5, the program instructions further comprising:
  program instructions to determine a second display order of the first review and the second review based, at least in part, on a third confidence score and a fourth confidence score, wherein (i) the third confidence score is based, at least in part, on a first evaluation of previous electronic conversations including the first contact as a participant; and (ii) the fourth confidence score is based, at least in part, on a second evaluation of previous electronic conversations including the second contact as a participant.

9. A computer system comprising:
  one or more computer processors;
  one or more computer readable storage media; and
  program instructions stored on the computer readable storage media for execution by at least one of the one or more processors, the program instructions comprising:
    program instructions to identify a web page for an item being viewed by a user, wherein the item is offered for sale by an online marketplace;
    program instructions to retrieve at least one contact of the user from a social network;
    responsive to a determination the at least one contact reviewed the item, program instructions to send a review authored by the at least one contact to the user;
    responsive to an indication from the user, program instructions to initiate an electronic conversation between a first contact and the user to discuss the item being viewed by the user, wherein the electronic conversation includes a shared view of the web page for the item between the first contact and the user;
    responsive to receiving an annotation made by the user on the shared view, program instructions to display the annotation on the shared view of the page for the first contact;
    program instructions to determine a display order of a first review and a second review based, at least in part, on a first confidence score and a second confidence score, wherein (i) the first confidence score indicates a similarity in a purchase history of the user and a purchase of the first contact; and (ii) the second confidence score indicates a similarity in the purchase history of the user and a purchase of a second contact;
    program instructions to display the first review for the item posted by the first contact based on the display order, wherein the first review is displayed in the shared view of the web page for the item between the first contact and the user; and
    program instructions to display the second review for the item posted by the second contact based on the display order, wherein the second review is displayed in the shared view of the web page for the item between the first contact and the user.

10. The computer system of claim 9, wherein the electronic conversation includes a copy of the review.

11. The computer system of claim 9, the program instructions further comprising:
  program instructions to store the electronic conversation; and
  responsive to an indication that a second user views the item, program instructions to send an indication of the electronic conversation to the second user, wherein the second user is a contact in the social network of one or more of the user or the at least one contact.

\* \* \* \* \*